(12) United States Patent
Kulas

(10) Patent No.: US 7,901,071 B1
(45) Date of Patent: Mar. 8, 2011

(54) EYEGLASS INCLUDING A LIGHT SOURCE DIRECTED AT THE EYE

(76) Inventor: Charles J. Kulas, San Francisco, CA (US)

( * ) Notice: Subject to any disclaimer, the term of this patent is extended or adjusted under 35 U.S.C. 154(b) by 0 days.

(21) Appl. No.: 12/580,237

(22) Filed: Oct. 15, 2009

(51) Int. Cl.
 *G02C 1/00* (2006.01)
(52) U.S. Cl. .......................................... 351/158; 351/41
(58) Field of Classification Search ............... 351/158, 351/41, 51, 52; 362/103, 105, 800
 See application file for complete search history.

(56) References Cited

U.S. PATENT DOCUMENTS

| | | | | |
|---|---|---|---|---|
| 3,621,838 A * | 11/1971 | Harding et al. | ................. | 607/90 |
| 4,938,582 A * | 7/1990 | Leslie | ............................ | 351/158 |
| 5,092,669 A * | 3/1992 | Anderson | ..................... | 351/203 |
| 5,486,880 A * | 1/1996 | House | ............................ | 351/158 |
| 6,857,739 B1 * | 2/2005 | Watson | ......................... | 351/158 |
| 7,175,273 B2 * | 2/2007 | Lee | ................................ | 351/51 |

* cited by examiner

*Primary Examiner* — Hung X Dang
(74) *Attorney, Agent, or Firm* — Charles J. Kulas

(57) ABSTRACT

An eyeglass for improved vision that includes a light source mounted on the eyeglass pointing to an eye and a controller on at least one arm of the eyeglass. An eyeglass wearer can turn on the light source and increase an intensity of light emerging from the light source by using a thumb wheel in the controller. The light source causes a contraction of an iris of the eye thereby requiring a less part exposure of a lens of the eye. The less part exposure of the lens improves vision of the eyeglass wearer. The light source can be arranged to point at least one or both the eyes of the eyeglass wearer. The eyeglass can include a plurality of light sources in different positions that can be selectively turned on by the thumb wheel and can accommodate any suitable controller.

11 Claims, 5 Drawing Sheets

EYEGLASS INCLUDING A LIGHT SOURCE DIRECTED AT THE EYE

CROSS REFERENCES TO RELATED APPLICATIONS

This application is related to co-pending U.S. patent application Ser. No. 12/580,236 filed on Oct. 15, 2009, entitled "EYEGLASS USING ADJUSTABLE PUPIL MASK TO IMPROVE VISION" which is hereby incorporated by reference as if set forth in full in this specification for all purposes.

BACKGROUND

Embodiments of the invention relate generally to an eyeglass for improved vision and more specifically to an eyeglass including a light source directed at an eye.

Due to effects such as genetics, the environment, old age, etc., a person's eye lens may become imperfect as it loses its desired shape or curvature, becomes damaged, tainted or internally obscured, or suffers from other undesirable effects, defects or errors. When an iris is contracted, the pupil, which is the opening of the eye, becomes tiny and a smaller part of the lens is used. Hence, the error may be diminished and can become inconsequential or negligible if the part of the lens in error is no longer being used to process an image that enters the smaller pupil.

Such contracting of the iris occurs naturally, in response to the presence of a greater amount of light. However, controlling the iris size by controlling ambient lighting is often not possible or practical and in many cases may only achieve a limited

SUMMARY

Embodiments of the present invention provides an eyeglass for improved vision that comprises a light source mounted on the eyeglass pointing to an eye of an eyeglass wearer and a controller on at least one arm of the eyeglass. A thumb wheel is included in the controller to turn on the light source and to increase an intensity of light emerging from the light source. In a particular embodiment, the eyeglass wearer can turn on the light source by rotating the thumb wheel to cause a contraction of an iris of the eye. The contraction of the iris leads to a less part exposure of a lens of the eye. The less part exposure of the lens due to the light source improves vision of the eyeglass wearer.

In an embodiment of the invention, the light source directed at the eye can also be configured to point at least one or both the eyes of the eyeglass wearer. The light source may include a power source for providing an electrical power to the light source and means for attaching the light source to the eyeglass. In one embodiment, the eyeglass can accommodate any suitable controller and include a plurality of light sources in different positions that can be selectively turned on by the thumb wheel. In general, any controller, or light source can be used.

In another embodiment of the invention, the eyeglass includes a sensor. The sensor can be a proximity sensor, light intensity sensor, or the like. The sensor can be configured to detect objects close to the eyeglass and react to an ambient light intensity, object proximity, or the combination of both. The light source automatically turns on and gets intensified depending on the ambient light intensity sensed by the sensor.

In one another embodiment of the invention, a processor associated with the controller is connected with a plurality of subsystems including a user control, communication, storage memory, and light intensity control. Any type of user control can be used such as a push button, rotating dial, finger wheel, touch types of control, voice recognition control, computer control, etc. The communication in connection with the processor may be used for accessing wired or wireless communication. The eyeglass wearer can download different intensity of light and can store in the storage memory which can be a non-volatile random access memory or any suitable types of storage memory where the eyeglass wearer can set the settings manually as wanted and then press another user control and save the setting. The user control may include an on/off button to allow the light source to be turned on or off and a light intensity adjuster to adjust the intensity of light emerging from the light source and can be stored to be applied later. The light intensity control may be used to control the light source directed at the eye.

One embodiment provides a method for improved vision using the eyeglass, the method comprising providing the eyeglass comprising a light source, wherein the light source is directed at an eye of an eyeglass wearer; turning on the light source by a thumb wheel of a controller, wherein the controller is on at least one arm of the eyeglass; and adjusting an intensity of light emerging from the light source by the thumb wheel, wherein an iris of the eye contracts more thereby requiring a less part exposure of a lens of the eye.

A further understanding of the nature and the advantages of particular embodiments disclosed herein may be realized by reference of the remaining portions of the specification and the attached drawings.

BRIEF DESCRIPTION OF THE DRAWINGS

FIG. 2 shows the eyeglass without the light source powered on;

DETAILED DESCRIPTION OF EMBODIMENTS

Figure 1:
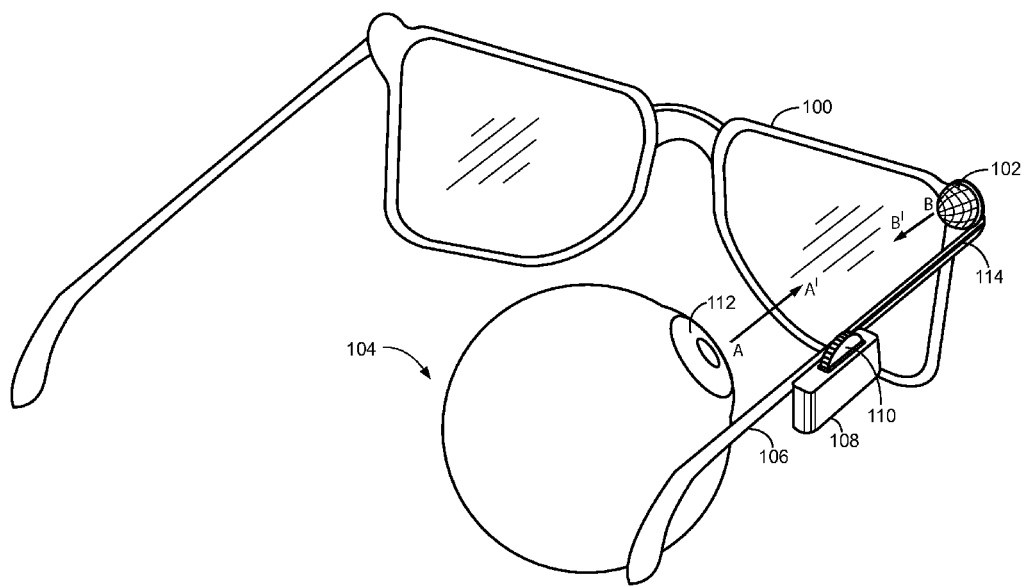
FIG. 1 shows an eyeglass with a light source powered on and shining in a direction B-B' and an eye looking in a direction A-A'.

FIG. 1 shows an eyeglass 100 with a light source 102 powered on and shining in a direction B-B' and an eye 104 looking in a direction A-A'. The light source 102 mounted on the eyeglass 100 points in a direction of eye 104 of an eyeglass wearer (not shown) so that at least a portion of light emitted by light source 102 directly impinges eye 104 to cause contraction or dilation of iris 112 of eye 104. At least one arm of the eyeglass 106 includes a controller 108 that has a thumb wheel 110 to turn on the light source 102 and to increase an intensity of light emerging from the light source 102. In one embodiment, the eyeglass wearer can turn on the light source 102 by rotating the thumb wheel 110 to cause a contraction of an iris 112 of the eye 104. The contraction of the iris 112 leads to a less part exposure of a lens (not shown) of the eye 104. Thus improved vision can be achieved due to the less part exposure of the lens.

A conductive trace 114 travels from the controller 108 to the light source 102 when the light source 102 turns on. An ambient light intensity in the surrounding or environment has not caused the contraction of the iris 112, only the light source 102 itself caused the contraction of the iris 112.

In the preferred embodiment, the light source 102 directed at the eye 104 can also be configured to point at least one or both the eyes of the eyeglass wearer. The light source 102 may include a power source (not shown) for providing an electrical power to the light source 102 and means for attaching the light source 102 to the eyeglass 100. The eyeglass 100 can accommodate any suitable controller 108 and include a plurality of light sources in different positions that can be selectively turned on by the thumb wheel 110. In general, any controller, or light source can be used. The controller 108 can be configured to mount anywhere on the eyeglass 100.

Figure 2:
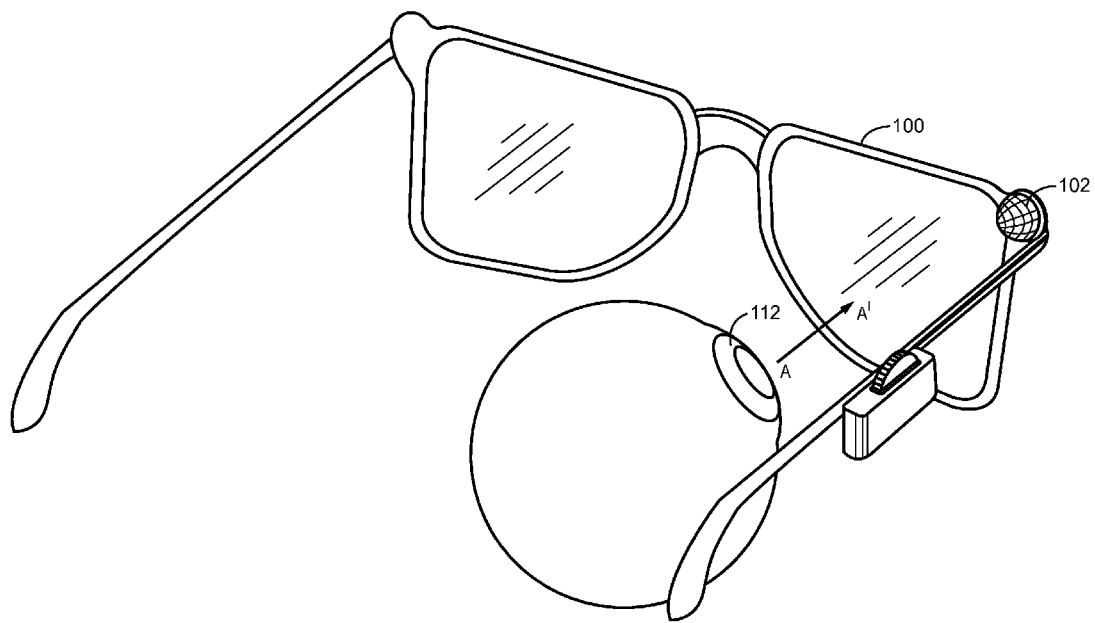

FIG. 2 shows the eyeglass 100 without the light source 102 powered on. As shown, in the absence of light rays from the light source 102, the iris 112 may not contract that causes more exposure of the lens resulting in blurred vision.

Figure 3:
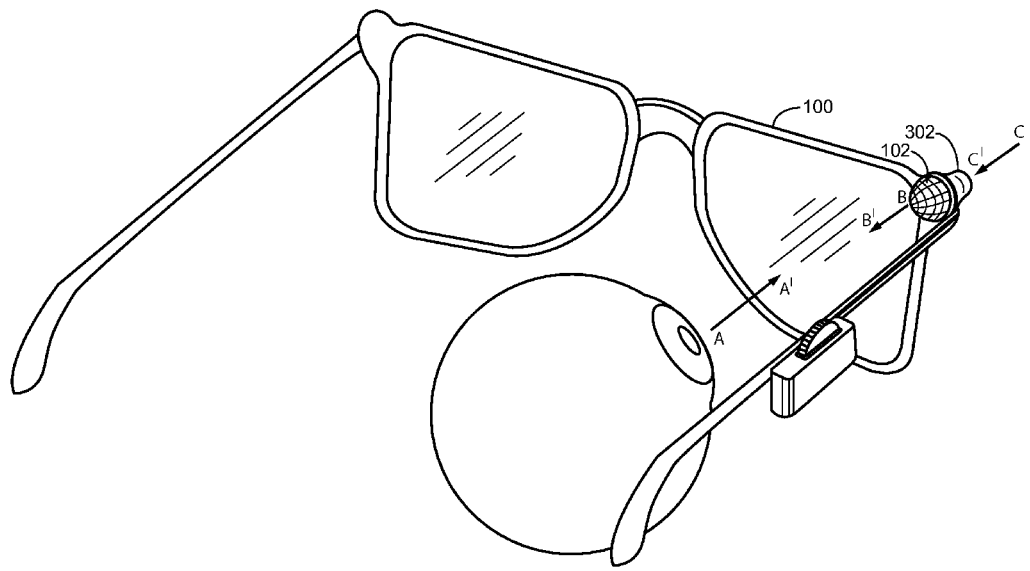
FIG. 3 shows the eyeglass with a sensor in a C-C' direction.

In an alternate embodiment of the invention 300 shown in FIG. 3, the eyeglass 100 has a sensor 302 in a C-C' direction. The sensor 302 can be a proximity sensor, light intensity sensor, or the like. The sensor 302 can be configured to detect objects close to the eyeglass 100 and react to the ambient light intensity, object proximity, or the combination of both. The light source 102 automatically turns on and gets intensified depending on the ambient light intensity sensed by the sensor 302.

Figure 4:
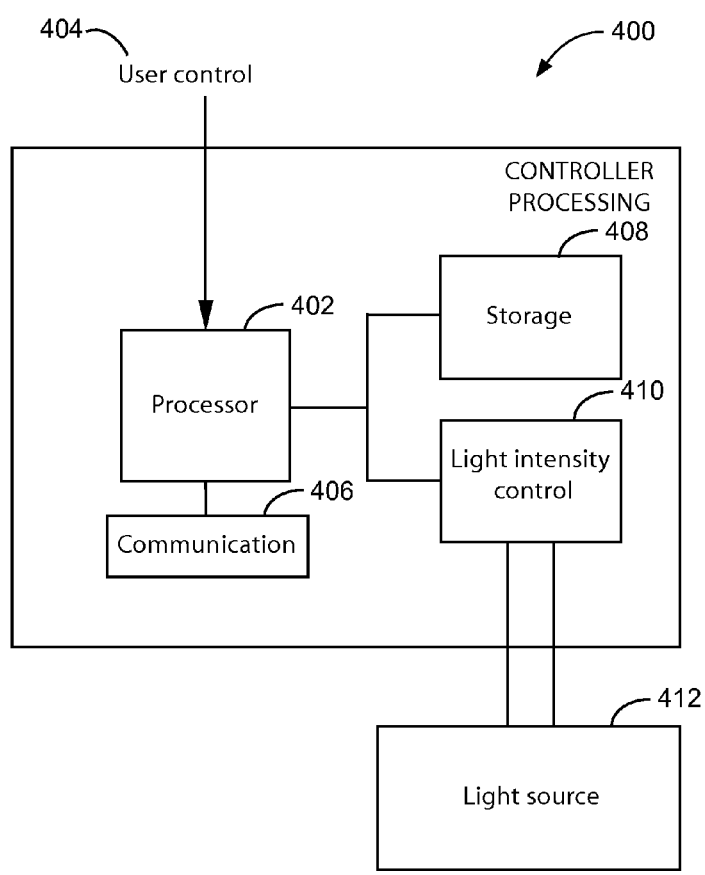
FIG. 4 shows a block diagram illustrating a controller processing of the light source.

FIG. 4 shows a block diagram illustrating a controller processing 400 of a light source 412 according to one embodiment of the present invention. As shown, a processor 402 is associated with a plurality of subsystems including a user control 404, a communication 406, a storage memory 408, and a light intensity control 410. It should be apparent that any type of user control can be used such as a push button, rotating dial, finger wheel, touch types of control, voice recognition control, computer control, etc. In general, the user control 404 can be any type of user operated control. The communication 406 in connection with the processor 402 may be used for accessing wired or wireless communication. Any type of communication form is possible that is allowed to connect with a computer or an external processor, for example a cell phone that could go over the internet to an optician's office.

The eyeglass wearer can download different intensity of light and can store in the storage memory' 408 which can be a non-volatile random access memory or any suitable types of storage memory where the eyeglass wearer can set the settings manually as wanted and then press another user control and save the setting. The user control 404 may include an on/off button (not shown) to allow the light source 412 to be turned on or off and a light intensity adjuster (not shown) to adjust the intensity of light emerging from the light source 412 and can be stored to be applied later. The light intensity control 410 may be used to control the light source 412 directed at the eye 104. The light source 412 can be modulated or controlled automatically for example, by a computer control or another device such as a cell phone, wrist watch, a lap top, etc.

Figure 5:
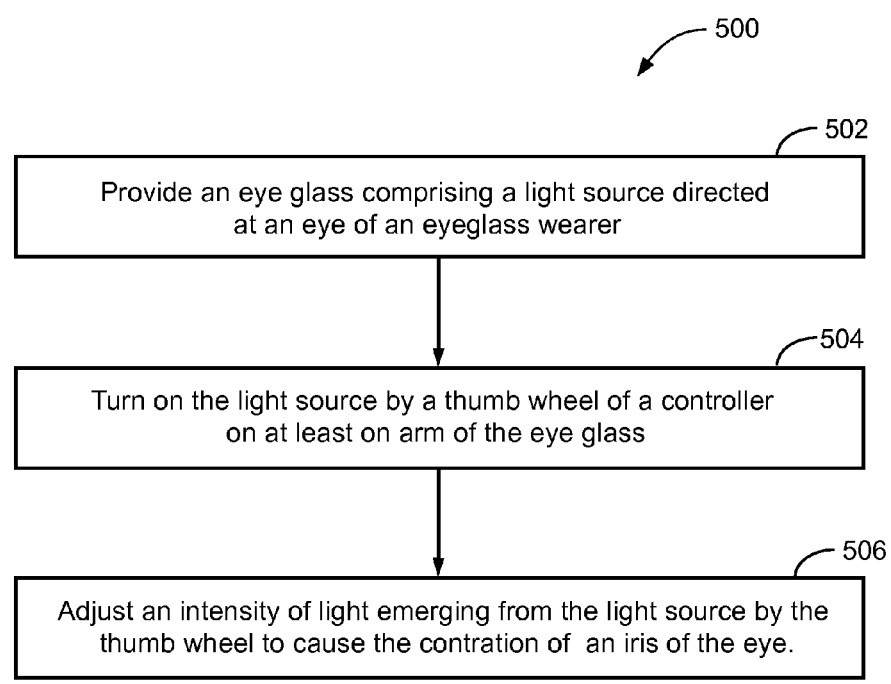
FIG. 5 shows an operational flowchart illustrating a method for improved vision using the eyeglass.

FIG. 5 shows an operational flowchart illustrating a method for improved vision using an eyeglass 500. As indicated at block 502, the eyeglass comprising a light source directed at an eye of an eyeglass wearer is provided. The light source is turned on by a thumb wheel of a controller on at least one arm of the eyeglass as indicated at block 504. Depending on an ambient light intensity, an intensity of light emerging from the light source is adjusted by the thumb wheel to cause contraction of an iris of the eye and a less part exposure of a lens of the eye as indicated at block 506.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object-oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in association with an instruction execution device, or method. Particular embodiments can be implemented in the form of instructions or other control logic in software or hardware or a combination of both. The control logic, when executed by one or more processors, may be operable to perform that which is described in particular embodiments.

Particular embodiments may be implemented by using a programmed general-purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Thus, while particular embodiments have been described herein, latitudes of modification, various changes, and substitutions are intended in the foregoing disclosures, and it will be appreciated that in some instances some features of particular embodiments will be employed without a corresponding use of other features without depending from the scope and spirit as set forth. Therefore, many modifications may be made to adapt a particular situation or material to the essential scope and spirit.

The invention claimed is:

1. An eyeglass for improved vision, the eyeglass comprising:
    a light source mounted on the eyeglass that points in a direction of an eye of a wearer of the eyeglass so that at least a portion of light emerging from the light source directly impinges the eye;
    a sensor mounted on the eyeglass for outputting a signal in response to (i) ambient light intensity or (ii) object proximity; and
    a controller for controlling the light emerging from the light source in response to the signal from the sensor.

2. The eyeglass of claim 1, wherein the controller turns the light source on or off.

3. The eyeglass of claim 1, wherein the controller provides for user adjustment of an intensity of the light emerging from the light source.

4. The eyeglass of claim 1, wherein the light source can be manually positioned to point to at least one or both the eyes of the eyeglass wearer.

5. The eyeglass of claim 1, further comprising:
a plurality of light sources.

6. The eyeglass of claim 1, wherein the controller includes a wheel operable by a wearer of the eyeglass.

7. The eyeglass of claim 1, wherein the controller causes the light emerging from the light source to increase with an increase in the ambient light intensity.

8. The eyeglass of claim 1, wherein the controller causes the light emerging from the light source to decrease with an increase in ambient light intensity.

9. The eyeglass of claim 1, wherein the controller causes the light emerging from the light source to increase with an increase in the object proximity to the sensor.

10. The eyeglass of claim 1, wherein the controller causes the light emerging from the light source to decrease with an increase in the object proximity to the sensor.

11. The eyeglass of claim 1, wherein the controller is responsive to a signal from an external processor.

\* \* \* \* \*